US005479956A

United States Patent [19]

Yuda

[11] Patent Number: 5,479,956

[45] Date of Patent: Jan. 2, 1996

[54] RELEASE APPARATUS FOR PNEUMATIC VALVE OPERATOR AND METHOD

[75] Inventor: Lawrence F. Yuda, Seneca, S.C.

[73] Assignee: Compact Air Products, Inc., Westminster, S.C.

[21] Appl. No.: 311,265

[22] Filed: Sep. 26, 1994

[51] Int. Cl.$^6$ .......... F16K 35/00

[52] U.S. Cl. .......... 137/15; 251/91; 251/95; 251/113

[58] Field of Search .......... 251/91, 95, 111, 251/113, 231, 236, 242; 137/15, 315; 72/407, 409

[56] References Cited

U.S. PATENT DOCUMENTS

| | | | |
|---|---|---|---|
| 726,206 | 4/1903 | Whiteley | 251/91 |
| 813,110 | 2/1906 | Norling | 251/111 |
| 1,027,061 | 5/1912 | Norling | 251/113 |
| 1,040,343 | 10/1912 | Johnston | 251/91 |
| 1,131,794 | 3/1915 | Rhodes | 251/113 |
| 2,109,511 | 3/1938 | Simon | 251/91 |
| 2,618,459 | 11/1952 | Forss | 251/113 |
| 2,620,195 | 12/1952 | Gillerstrom | 251/113 |
| 3,323,346 | 6/1967 | Spangler et al. | 72/407 |
| 4,619,435 | 10/1986 | Biek | 251/113 |

*Primary Examiner*—George L. Walton
*Attorney, Agent, or Firm*—Ralph Bailey

[57] ABSTRACT

A release mechanism for permitting the operation of a pneumatic valve includes a ring (A) extending about a cylindrical hand held housing for manual manipulation to move a blocking member (B) from beneath a depressible valve operator (D) and is provided with resilient means (C) normally biasing the blocking member (B) towards a blocking position beneath the handle (D) but which may be moved by manual manipulation of the ring against the force of resilient means (C) which automatically returns the blocking member to blocking position after the handle is moved for actuating the pneumatic valve and the like for operating the hand held mechanism.

7 Claims, 3 Drawing Sheets

RELEASE APPARATUS FOR PNEUMATIC VALVE OPERATOR AND METHOD

BACKGROUND OF THE INVENTION

This invention relates to a release mechanism for use with a hand held pneumatic valve operated device for requiring a positive action of the operator in order to release the valve operator to actuate a pneumatic device but which automatically returns to blocking position without further action by an operator.

Elongated pivoted handles extending in general longitudinal alignment with an elongated hand held housing containing the pneumatic power operated mechanism for operating tools are commonly used for actuating suitable control valves. It is an accepted practice to utilize pivoted blocking means which require the operator to disengage the blocking mechanism preparatory to actuation of the tool. Such a device is illustrated in U.S. Pat. No. 3,323,346. The operators sometimes neglect to return such operating mechanism to a blocking position so that such inadequacy of the safety feature subjects the tool to the inadvertent actuation as may occur as a result of improvidently depressing the operator mechanism.

Such hand held assemblies are often used for power crimping tools carried by the cylinders remote from the air inlet and because such tools are operated with great force by the multi-piston arrangements, inadvertent actuation thereof may be hazardous to the operator and others nearby. This hazard is increased by the necessity for utilizing a pivoted handle exposed along the outside of the cylinder. Firing of the multi-piston arrangement through actuation of the pivoted handle may occur inadvertently, for example, as a result of dropping of the tool by an operator.

Accordingly, it is desirable to provide a release mechanism for a pneumatic valve and a mechanism for operating same wherein it is necessary for the operator to manually release a blocking member which normally prevents inadvertent firing with a provision for automatically restoring the blocking mechanism to a position to block inadvertent actuation of the valve operator.

SUMMARY OF THE INVENTION

Accordingly, it is an important object of the present invention to provide a manually operated release apparatus normally blocking a pneumatic valve operator which utilizes a circumferential ring extending about a cylindrical portion of a housing for releasing a blocking member or protuberance which is positioned beneath the operator to prevent inadvertent operation.

Another important object of the invention is the provision of a blocking mechanism which must be manually released but which utilizes a resilient member for automatically restoring the blocking member to operating or blocking position when the depressible pneumatic valve operator is returned to inoperative position after actuating a hand held tool.

Another important object of the invention is the provision of a circumferential ring mounted on a hand held housing carrying the pneumatic mechanism for a hand held tool wherein a protuberance is carried by the ring which is resiliently biased toward a blocking position of a pneumatic valve operator but which is manually releasable against a resilient force, preparatory to manually moving the pneumatic valve operator, through manipulation of the ring to remove a protuberance from blocking post position but which is returned by the resilient member automatically following actuation of the tool by depressing.

Another object of the invention is the provision of a resiliently biased blocking means for a hand-operated valve actuator normally retained in blocking position but which is manually releasable by movement of a ring carrying a blocking member.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
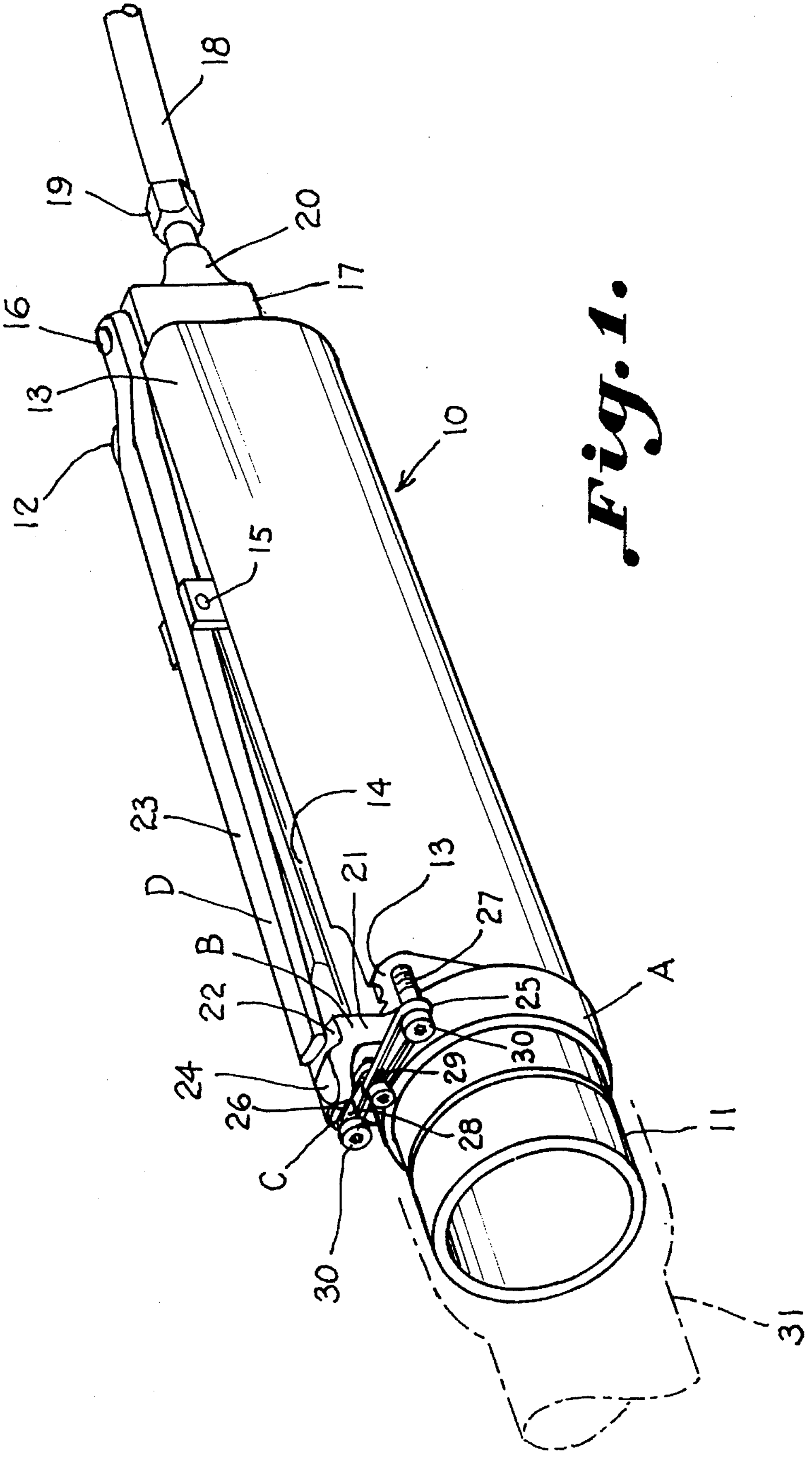
FIG. 1 is a perspective view illustrating a release mechanism constructed in accordance with the present invention in position for blocking the inadvertent actuation of a pivoted valve operator carried in general alignment with the housing which is provided with double resilient means for maintaining normal blocking position and for returning the protuberance to normal blocking position after actuation of the tool.

The drawings illustrate a hand operated release apparatus for use upon a cylindrical hand held housing having a manually movable depressible pneumatic valve operator for actuating a pneumatic device. A ring A is carried upon the cylindrical housing rotatable in response to manipulation by a hand of a user of the apparatus. A protuberance B is carried by the ring extending outwardly of the ring. A resilient member C is attached on the housing. The resilient member urges the protuberance to a blocking position preventing unintended movement of the pneumatic valve operator D. Thus, the protuberance is movable by the user by rotation of said ring against the force of said resilient member out of blocking position preparatory to manually moving the pneumatic valve operator, and the protuberance is automatically returnable to blocking position upon release of the ring through the action of the resilient member.

The cylindrical hand held housing is broadly designated at 10. The housing 10 has a cylindrical portion 11 carried forwardly of a pair of longitudinal lugs 12 and 13 defining a longitudinal recess 14 therebetween for accommodating an elongated pneumatic valve operator D. The pneumatic valve operator D is illustrated as being pivoted as at 15 intermediate its ends. One of the ends of the pneumatic valve operator D remote from the outside cylindrical portion of the housing 11 is connected as at 16 to a pneumatic valve mechanism 17 which is provided with a source of air under pressure by means of the line 18 which has connection through a suitable fitting 19 to port 20 carried by the valve 17.

Figure 2:
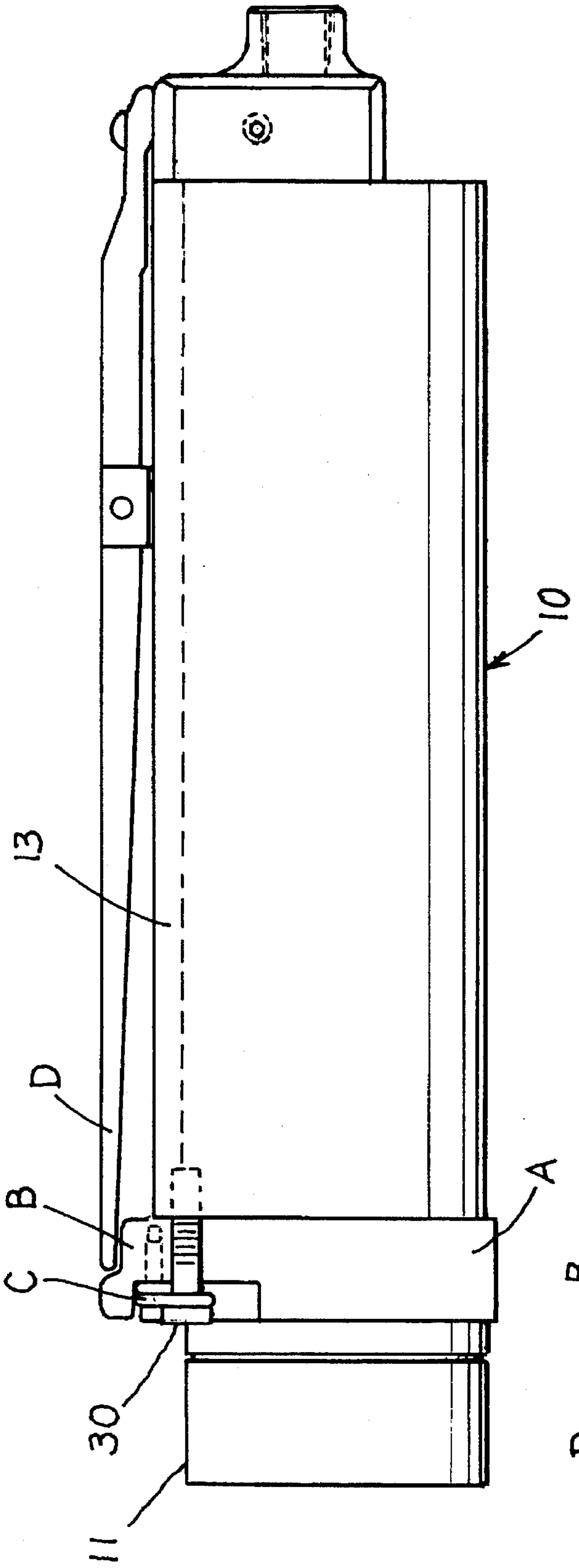
FIG. 2 is a side elevation further illustrating a hand held tool equipped with a release mechanism constructed in accordance with the present invention.
Figure 3:
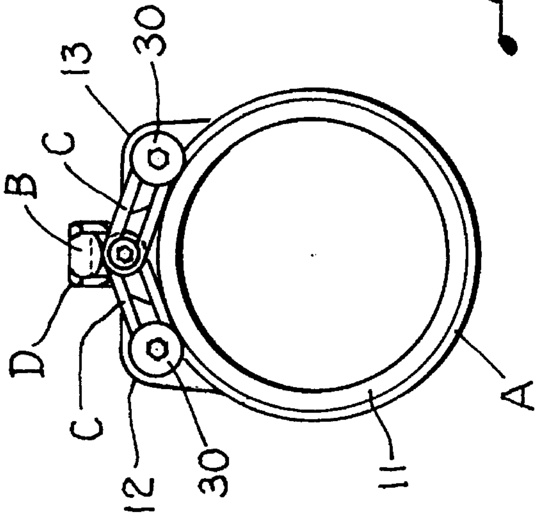
FIG. 3 is a front elevation illustrating the hand held tool of FIG. 2 with the release mechanism in blocking position to prevent inadvertent actuation of an elongated operator which is depressible to actuate the hand held tool.

A free end of the pneumatic valve operator D overlies a protuberance B which is carried by the circumferential ring A which extends substantially about the forward cylindrical portion of the housing 10. The ring is suitably secured for rotation upon the cylindrical portion 11 of the housing and may be manipulated manually to be moved in either a clockwise or counterclockwise direction in FIGS. 1–3 to remove the protuberance B from an outward portion of the valve operator. The protuberance B is illustrated in FIGS. 1–3 as including a substantially upright member 21 which terminates as at 22 with a flat stop portion for engaging the free end of an elongated linkage member 23 which extends generally in alignment longitudinally of the housing 10 within the recess 14. A forwardly and upwardly projecting portion 24 is carried by the upright member 21 and extending forwardly to act as a guard for the free end of the elongated linkage member 23 and provides an operator for ready engagement by the hand of the user to rotate the ring in either direction. Thus, the ring may be manually manipulated by direct engagement of the ring itself or by engagement of an operator.

The resilient member C includes a pair of resilient bands 25 and 26 which extend respectively over longitudinal outwardly extending posts 27 and 28 respectively and a central post 29 carried by the upright member 21 beneath the forward extension 24. It will be observed that each of the posts 27, 28, and 29 have cap members 30 thereon to prevent inadvertent dislodgement of the resilient members therefrom. FIG. 1 illustrates a tool 31 in broken lines which schematically represents a crimping tool such as illustrated in U.S. Pat. No. 3,323,346 or any other hand held tool which is to be operated by the pneumatic piston mechanism carried within the cylindrical housing 10.

Figure 4:
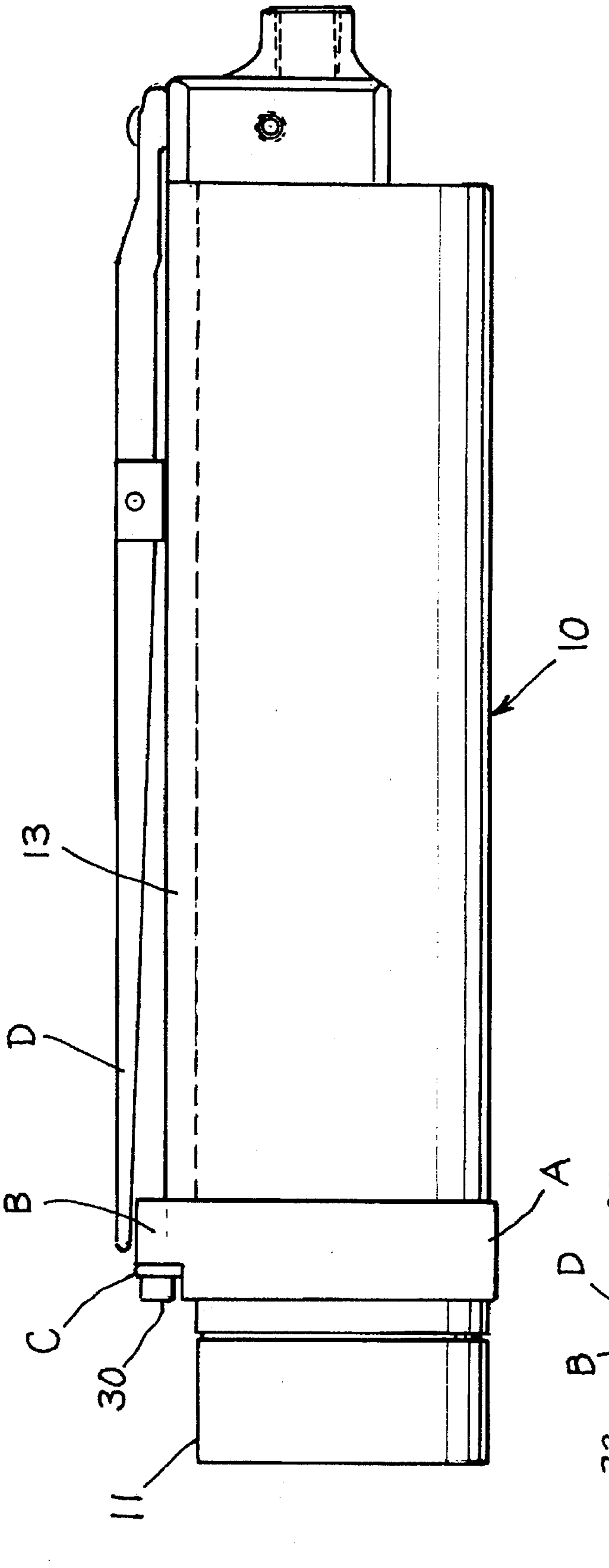
FIG. 4 is a longitudinal side elevation illustrating a modified form of the invention using a single resilient means urging a manually moved ring into normal blocking position.
Figure 5:
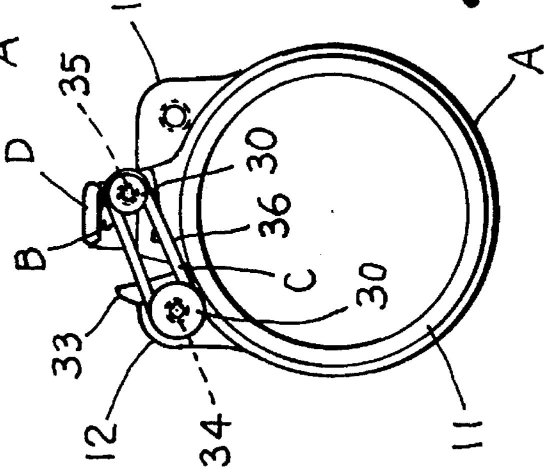
FIG. 5 is a front elevation further illustrating the modified form of the invention illustrated in FIG. 4.

Referring more particularly to FIGS. 4 and 5, it will be noted that a modified form of the invention includes a pair of spaced upwardly projections one of which is illustrated at 33 which serves as a stop member which engages a post 34 which is illustrated as carrying a cap member 30. Opposite the stop member 30 is the upwardly extending protuberance B which is integrally carried by the ring and which extends below the free end of the pneumatic valve operator D. A post 35 is carried thereby over which resilient means C which include a resilient band 36 which is deposed between the posts.

It is thus seen that a release mechanism is provided for manual actuation through the use of a circumferential ring having a protuberance extending outwardly therefrom into outwardly blocking position beneath a depressible operator. The proper positioning of the blocking mechanism to ensure safety is automatically provided for through the use of resilient means normally preventing the inadvertent dislodgement of the blocking mechanism returning same to position to prevent any inadvertent movement of the pneumatic valve operator which might cause actuation of the hand held tool.

While a preferred embodiment of the invention has been described using specific terms, such description is for illustrative purposes only, and it is to be understood that changes and variations may be made without departing from the spirit or scope of the following claims.

What is claimed is:

1. A hand operated release apparatus for use upon a cylindrical hand held housing having a manually movable depressible pneumatic valve operator for actuating a pneumatic device comprising:

a ring carried upon said cylindrical housing rotatable in response to manipulation by a hand of a user of the apparatus;

a blocking member carried by said ring extending outwardly of said ring;

a resilient member on said housing;

said resilient members urging said blocking member to a blocking position preventing unintended movement of said pneumatic valve operator; and said blocking member and said ring being rotatable about an exterior of the housing for moving the blocking member into and out of blocking position;

whereby said blocking member is movable by the user by rotation of said ring against the force of said resilient member out of blocking position preparatory to manually moving said pneumatic valve operator, and said blocking member is automatically returnable to blocking position upon release of the ring by the action of said resilient member.

2. The structure set forth in claim 1 wherein said ring extends entirely about said cylindrical housing for manual manipulation, said blocking member is a protuberance extending radially outwardly of a periphery of said ring, and said resilient member is attached to said ring on one end and to said housing on the other end.

3. The structure set forth in claim 2 wherein said valve operator is a lever pivoted intermediate its ends on said housing and carried in substantial longitudinal alignment therewith so that a free depressible end overlies said protuberance when in blocking position, and a pneumatic valve for actuating said pneumatic device carried on one end of said housing remote from said ring.

4. The structure set forth in claim 3 wherein said means normally retaining said protuberance in blocking position includes a pair of spaced posts carried by said housing one on each side of said protuberance, an intermediate post carried by said protuberance and elastic bands respectively connecting said spaced posts and said intermediate post.

5. The structure set forth in claim 3 wherein said means normally retaining said protuberance in blocking position includes a first post carried by said housing and a second post carried by said protuberance, an elastic band extending between said first and second posts, and a stop member limiting rotation of said ring responsive to the resilient force of said elastic band.

6. The method of actuating a pneumatic valve for operating a pneumatic device carried by a cylindrical hand held housing utilizing a manually movable depressible pneumatic valve operator comprising the steps of:

mounting a ring upon said cylindrical housing rotatable in response to manipulation by a hand of a user of the apparatus;

carrying a protuberance on said ring extending radially outwardly of a periphery of the ring;

attaching a resilient member to said ring on one end and to the housing on the other end;

retaining said protuberance in a blocking position preventing unintended movement of said pneumatic valve operator by the action of said resilient member; and rotating said blocking member and said ring about an exterior of the housing for moving the blocking member into and out of blocking position;

whereby the protuberance is rotatable by the user by rotation of the ring against the force of said resilient member out of blocking position preparatory to manually moving said pneumatic valve operator, and said protuberance is automatically returnable to blocking position upon release of the ring by the action of said resilient member.

7. The method set forth in claim 6 including the step of pivotally mounting said depressible pneumatic valve operator on said housing in substantial longitudinal alignment therewith.

* * * * *